United States Patent [19]

Follett

[11] 3,800,816
[45] Apr. 2, 1974

[54] FUEL LINE SHUT OFF
[75] Inventor: John L. Follett, Fair Haven, N.Y.
[73] Assignee: Follett Valves Inc., Fair Haven, N.Y.
[22] Filed: June 26, 1972
[21] Appl. No.: 266,369

Related U.S. Application Data
[63] Continuation-in-part of Ser. No. 79,432, Oct. 9, 1970, abandoned.

[52] U.S. Cl.................... 137/75, 137/460, 431/21, 431/89
[51] Int. Cl............................................. F16k 17/38
[58] Field of Search ............................... 137/70–73, 137/75–77, 457, 460, 498; 431/21, 89

[56] References Cited
UNITED STATES PATENTS
2,372,537  3/1945  Wantz..................... 137/66
3,195,647  7/1965  Campbell et al.................. 137/72 X
3,512,556  5/1970  McKhann.......................... 137/75 X Primary Examiner—Alan Cohan
Assistant Examiner—Richard Gerard
Attorney, Agent, or Firm—Charles S. McGuire

[57] ABSTRACT

A device for providing safety shut off of a fuel line in response to an unsafe condition, such as overheating. The device includes a movable diaphragm forming a wall of an expensible chamber and a valve closure member movable with a stem connected to the diaphragm. A separate excess flow valve may be connected to the diaphragm chamber for actuation in response to expansion of the chamber by diaphragm movement. The stem is spring biased toward movement to expand the chamber and close the valve element associated with the stem. Means are provided to hold the stem against the biasing force and are releasable by the breaking of a link when the unsafe condition is present.

6 Claims, 3 Drawing Figures

FUEL LINE SHUT OFF

REFERENCE TO RELATED APPLICATIONS

This is a continuation-in-part of application Ser. No. 79,432, filed Oct. 9, 1970, for Safety Control, now abandoned, of the same inventor.

BACKGROUND OF THE INVENTION

This invention relates to safety devices for automatic shut off of a fuel line in response to an unsafe condition. More specifically, the invention relates to novel structure for use either singly as a safety shut off device, or in combination with an excess flow actuated shut off valve as a control device for causing closure of such valve in response to an unsafe condition.

In U.S. Pat. No. 3,407,827 there is disclosed a valve for use in conjunction with portable or stationary gas heating devices supply by liquid under pressure liquid gaseous fuel supply cylinders. Such valves function to shut off flow should such flow exceed a predetermined volumetric rate, the valve remaining shut off until manually reset.

Placement of such a valve in a fuel line, for example, between a pressurized source and point of use will insure that the supply is shut off in response to a break in the line or other abnormality indicating an unsafe condition by excess flow rate of the fuel.

It is sometimes desirable to provide automatic shut off in response to other unsafe conditions such as excess heat at certain locations. The present invention provides this feature by means of a dual purpose valve-control unit device which may be used singly to shut off the fuel supply by means of a valve element contained therein, or in combination with an excess flow valve to create, in response to the overheating or other unsafe condition, a momentary excess flow sufficient to close the associated valve. The structure of the invention is thus versatile, lending itself to applications wherein it serves as a shut off valve as well as those wherein it is used as a control device for operating a separate shut off valve.

SUMMARY OF THE INVENTION

The structure comprises a spring biased stem within a housing having a chamber with a flexible diaphragm forming one wall thereof. The stem is affixed to the diaphragm and is held against the biasing force of the spring by means which are released in response to the presence of an unsafe condition, such as excess heat, water or other fluids in the area of the device. The end of the stem also serves as a valve closure element, cooperating with a seat within the structure to block the passage between inlet and outlet openings in the structure.

When used only as a control device, the structure is connected through one of the openings to an excess flow valve, such as that of the aforementioned U.S. patent, on the downstream side thereof, and the other of the openings is sealed off. Release of the retaining means allows swift axial movement of the stem, thereby moving the diaphragm to expand the volume of the chamber and draw air thereinto. This creates an excess flow through the valve to which the structure is connected, thus effecting closure thereof.

When used as a combination shut off-control device, the structure is again connected through one of the openings therein to the excess flow valve which in turn is connected to the fuel source, e.g., a pressurized gas cylinder. The structure is connected through the other opening, in this case the outlet, to the point of use, e.g., a gas burner. Thus, the gas flows from the cylinder, through the excess flow valve, through the structure of the present invention, to the burner. Actuation of the device to allow movement of the stem in the manner previously mentioned effects closure of the excess flow valve through expansion of the diaphragm chamber and at the same time closes the valve between the inlet and outlet of the device itself. Thus, supply of fuel to the point of use cannot be resumed until both valves have been reset.

When the device of the invention is used singly, the fuel supply is connected to one of the openings and the point of use to the other. Preferably, the inlet and outlet are reversed from the manner of connection in the application described in the preceding paragraph. That is, the inlet opening connected to the fuel source is the opening adjacent the lower side of the closure element; the opening communicating with the diaphragm chamber is used as the outlet. In this manner, pressure exerted from the source after the valve is closed is not exerted on the diaphragm.

DETAILED DESCRIPTION

Figure 1:
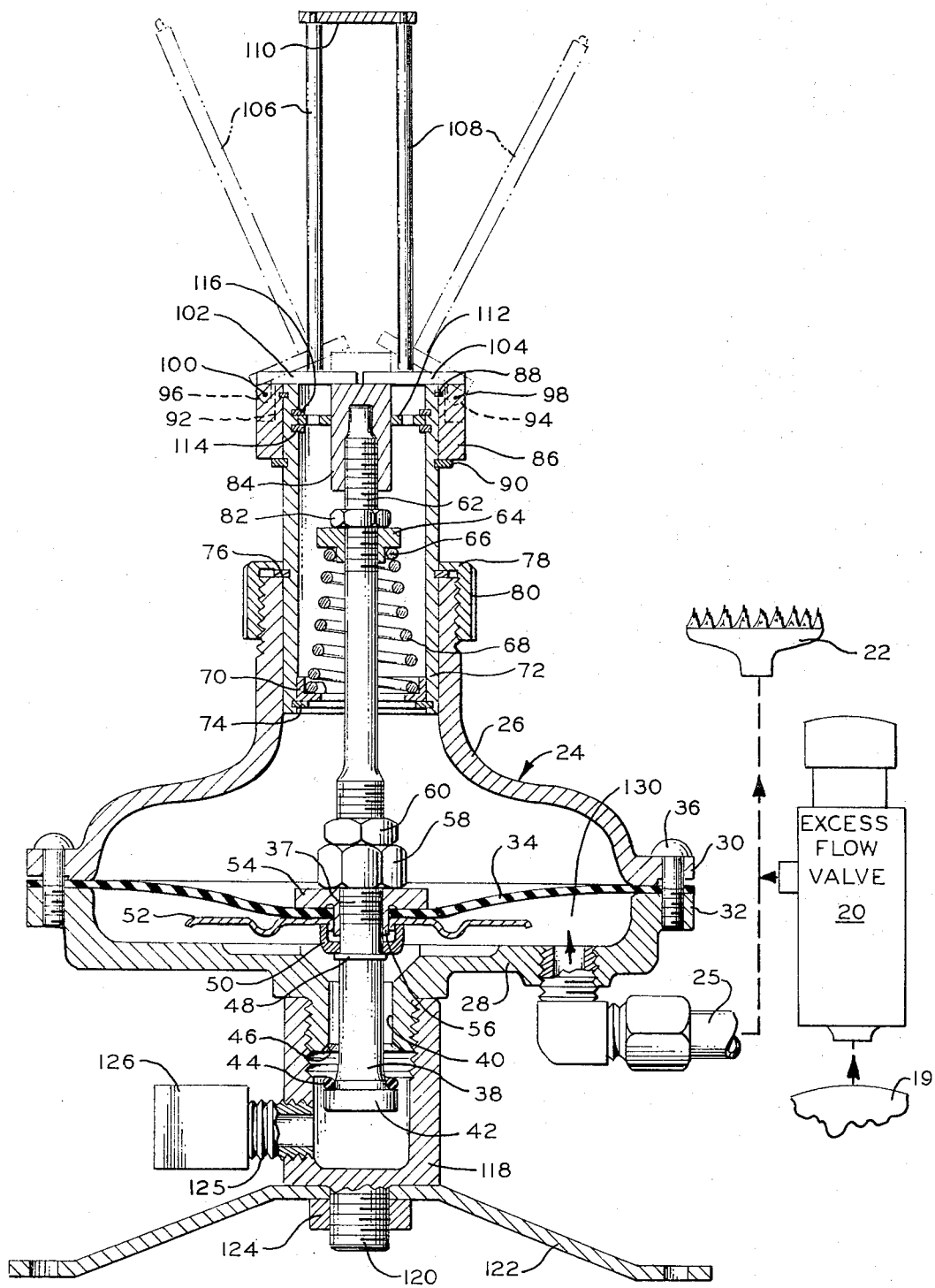
FIG. 1 is a front elevational view in half section of the structure of the invention, shown in combination with diagrammatically indicated fuel supply, excess flow valve and burner.

Referring now to the drawings, there is indicated a fragment of fuel cylinder 19 and a shut off valve 20, of the type described in U.S. Pat. No. 3,407,827, interposed in a line supplying either gaseous or liquid fuel to a burner 22 at a relatively uniform flow rate. Should the pipeline be broken, the flow would suddenly increase and operate the shut off valve. The sensitivity of the shut off valve to unwarranted flow increase which causes actuation of the valve, renders it possible to effect closure of the valve by a device generally indicated at 24, the device being connected by a conduit 25 to the outlet or downstream side of the excess flow valve.

Device 24 comprises a casing having upper and lower elements 26 and 28 having peripheral flanges 30 and 32 between which is clamped a flexible impervious diaphragm 34, the peripheral edge of which is clamped between the flanges by screws 36. Extending through a central aperture in the diaphragm is a central stem 37, which may, if desired extend downwardly as at 38 through central aperture 40 in the lower casing element 28 and be provided with a valve head 42 carrying an O-ring 44 adapted to seat on the conical valve seat 46 as shown.

The stem is provided with a shoulder 48 against which a cup like collar 50 bears, the collar in turn engaging a diaphragm guard disk 52 on the under side of the diaphragm 34. A second collar 54 above the diaphragm is provided with a sleeve 56 projecting through the diaphragm aperture, and is adapted to clamp the diaphragm between the outerportion of the collar and the guard plate by pressure applied through the nut 58, which is backed up by a lock nut 60.

The upper end of the stem is threaded as at 62 and provided with a nut 64 having an annular shoulder 66, against which the upper end of conical compression spring 68 bears. The lower end of the spring is seated on an angle section ring 70 secured within cylinder member 72, and bearing against a lock ring 74 in an annular groove in the inside wall of the member 72. The cylindrical member is provided externally with a lock ring 76 seated in an annular external groove, and such lock ring bears against the upper annular edge of the casing element 26, and is secured in place by the internal flange 78 of the threaded cap 80. The nut is adjustable along the threaded portion 62 of the stem, and locked in place by a lock nut 82. The upper end of the stem is provided with a threaded cap 84.

The outer upper end of the cylindrical member 72 is provided with an annular collar 86, the upper end of which bears against the outer half of a split ring 88, the inner half of which nests in an annular groove. The collar is held against the ring 88 by a split retaining ring 90 seated in an external annular groove provided for the purpose. The opposite sides of the collar are recessed as at 92 to provide trunnion ears 94 and 96, on which are pivoted as at 98, 100, semi-circular hold down plates 102 and 104. Each plate is provided with a lever arm as 106 and 108, the outer ends of which are tied against spreading by a link member 110, which may be fusible, combustible, disolvable, or otherwise destructible in response to an unsafe condition such as fire, over-heating, or the presence of water, chemicals, etc.

The inside upper end of the cylinder member 72 is provided with a perforate disk 112 held between split retaining rings 114 and 116, seated in internal grooves in the cylinder wall formed for the purpose.

The lower casing element 28 may be provided with a threaded mounting cap 118, which an integral threaded boss 120 that can be secured to a strap iron mounting bracket 122 by a nut 124. The cap may have a nipple 125, which may be capped as at 126, or connected to other similar devices in a closed circuit.

As shown, the levers 106 and 108 through the tie link 110 hold the stem 37 depressed against the spring 68, holding the diaphragm 34 depressed as shown. Should the tie link 110 melt, burn or be otherwise destroyed or broken by the occurrence of an unsafe condition, the levers 106 and 108 are released, and the hinged plates 102 and 104 flip up to release the stem 37 for instant upward movement, causing rapid expansion of the chamber 130. The expansion causes a sudden increase in flow through valve 20 to cause the same to shut off the flow of gas from the supply cylinder 19 to the burner 22. If further devices are connected together by a pipeline leading from the nipple, such devices may be located at strategic positions for sensing an unsafe condition. The sudden release of the diaphragm of any one of the devices in such a circuit will cause an instantaneous increase in flow at valve 20 to move the valve to shut off position, where it is retained until manually reset.

While the chamber 130 is defined partly by a flexible diaphragm it will appear that a piston moving in a cylinder could as well provide the sudden rarification that would cause a sudden increase of flow at valve 20, to effectively cause it to shut-off.

Turning now to FIG. 2, device 24 is again connected to excess flow valve 20 through conduit 25, thus connecting the downstream side of valve 20 to the expansible chamber 130 of device 24. The construction of device 24 may be the same as that shown in FIG. 1, and common reference numerals as used herein. Rather than sealing off the opening at nipple 125, however, a line is provided to carry fuel therefrom to burner 22. That is, fuel passes from source 19, through excess flow valve 20, through device 24 from an inlet at 25 to an outlet at 125, and thence to burner 22. Additional burners and/or devices 24 may be provided downstream of the illustrated burner, as indicated.

With the shut off system connected in this manner, actuation of device 24 will serve to close valve 20 as previously described. In addition, O-ring 44 will form a closure with seat 46 to provide an additional blockage in the line between source 19 and burner 22. In this manner, fuel supply to burner 22 cannot be resumed until both device 24 and valve 20 have been reset, thus providing an additional safety feature. It should also be noted that should O-ring 44 be destroyed or become inoperative for any reason, the device would still be operative since a metal-to-metal seal of valve head 42 and seat 46 would result.

Figures 2, 3:
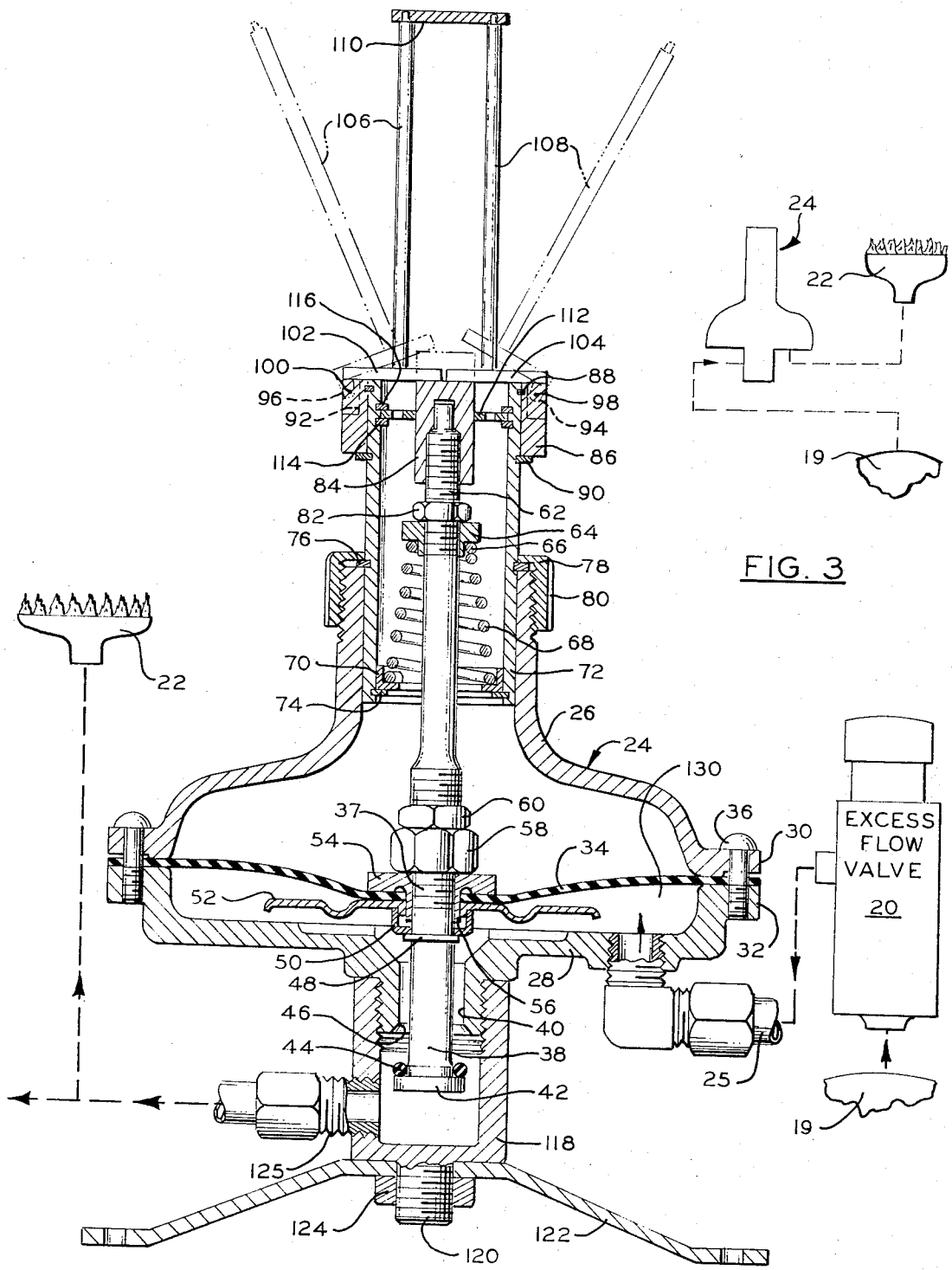
FIG. 2 is a like view, showing a different application of the structure of the invention.
FIG. 3 is a diagrammatic showing of still another application of the invention.

In FIG. 3 is shown yet another application of device 24, this time providing the only closure element between source 19 and burner 22. The source is preferably connected to the device through nipple 125, and the burner through conduit 25, thus reversing the inlet and outlet as shown in the FIG. 2 embodiment. Actuation of device 24 will serve to shut off the flow of fuel from the source to the burner through closure of O-ring 44 and seat 46. Since the inlet is through nipple 125, pressure from source 19 will be exerted on the lower side of valve head 42 and not on the diaphragm, which could possibly be ruptured by such pressure.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A safety shut-off system for a fuel supply line, said system comprising, in combination:
   a. a valve interposed in the supply line and adapted to close in response to an abnormal flow rate of the fuel; and
   b. a control device connected to said valve to effect closure thereof in response to an unsafe condition, said control device having:
      i. an expansible chamber communicating with said valve on the downstream side thereof, whereby rapid expansion of said chamber produces an abnormal flow rate, and thereby closure of said valve;
      ii. means biasing a movable portion of said chamber toward rapidly expanding movement;
      iii. means normally retaining said movable portion in an initial position, against the force of said biasing means; and iv. means for releasing said retaining means in response to said unsafe condition.

2. The invention according to claim 1 wherein said chamber comprises a solid casing, said movable portion comprises an impervious diaphragm having an attached stem to effect movement thereof, and said biasing means comprises a spring urging said stem toward moving said diaphragm to expand the interior volume of said chamber.

3. The invention according to claim 2 wherein said retaining means comprise at lease one member positioned to block movement of said stem, and said releasing means comprises a link breakable in response to said unsafe condition, said member and link being so constructed and arranged that said link holds said member in position to block movement of said stem until said link is broken, whereupon said member may move out of its blocking position to allow movement of said stem and diaphragm to expand said chamber.

4. A control device according to claim 3 in which the link comprise a fusible element.

5. The invention according to claim 1 wherein the communication of said valve and expansible chamber forms an inlet to said device for the fuel, and said device further includes an outlet and a movable valve closure element interposed between said inlet and outlet, and movable from open to closed position in response to release of said retaining means.

6. The invention according to claim 5 wherein said movable portion comprises a stem and said closure element is arranged on one end of said stem.

* * * * *